United States Patent [19]

Dahlén

[11] Patent Number: 4,785,591

[45] Date of Patent: Nov. 22, 1988

[54] JOINT BETWEEN TWO TUBES OF SQUARE OR RECTANGULAR CROSS-SECTION

[76] Inventor: Gustav L. Dahlén, Ärlestigen 1, S-703 48 Örebro, Sweden

[21] Appl. No.: 60,389

[22] PCT Filed: Sep. 26, 1986

[86] PCT No.: PCT/SE86/00433

§ 371 Date: May 28, 1987

§ 102(e) Date: May 28, 1987

[87] PCT Pub. No.: WO87/02084

PCT Pub. Date: Apr. 9, 1987

[30] Foreign Application Priority Data

Sep. 30, 1985 [SE] Sweden .................. 8504518

[51] Int. Cl.⁴ .................. E04B 2/56; E04B 1/38; F16L 41/08
[52] U.S. Cl. .................. 52/73; 52/285; 52/725; 403/262
[58] Field of Search .................. 52/284, 285, 283, 243, 52/73, 724, 725, 727, 456, 664, 665, 666, 667, 669; 211/182, 183; 403/262, 230, 199

[56] References Cited

U.S. PATENT DOCUMENTS

| | | | |
|---|---|---|---|
| 3,832,811 | 9/1974 | Briel, Jr. | 52/73 |
| 3,970,401 | 7/1976 | Lubeck | 52/724 |
| 4,125,973 | 11/1978 | Lendrihas | 52/724 |
| 4,137,576 | 2/1979 | Greene | 52/73 |
| 4,632,473 | 12/1986 | Smith | 211/182 |
| 4,660,331 | 4/1987 | Dahler et al. | 52/73 |

Primary Examiner—Michael Safavi
Attorney, Agent, or Firm—Young & Thompson

[57] ABSTRACT

In a joint between first and a second rectangular tube, the first tube has its end provided with anchoring means and inserted through an insertion opening in the front wall of the second tube. The anchoring means located within the second tube are embedded in the concrete filling the two tubes. The anchoring means consist i.a. of two wings which form extensions of the side walls of the second tube, and a tongue which forms an extension at the end of an intermediate wall, constituting an extension of one transverse wall of the second tube. This anchoring tongue lies along the rear wall or the second tube.

7 Claims, 2 Drawing Sheets

JOINT BETWEEN TWO TUBES OF SQUARE OR RECTANGULAR CROSS-SECTION

The present invention relates to a joint of the type described in the preamble of the following main claim. An example of such a joint is described in Swedish Lay-Open Print 8301953-9.

In the known joint, separate anchoring means are used, which can be fixed to one of the tubes and inserted through an insertion opening in the other tube to be embedded when the two tubes are filled with concrete, particularly expanding concrete.

The object of the present invention is to make possible a simplified and thus cheaper manufacture of a tube provided with such anchoring means. This is achieved by a joint which in accordance with the invention has the characterizing features defined in the following main claim.

In manufacturing the first tube, which is to be provided with the anchoring means, this can be done simply by laser cutting and subsequent bending of the parts thus freed to positions disclosed in the characterizing clause of the main claim. Usually the first tube is substantially narrower than the second tube, but within the scope of the invention it is also possible to make a joint between two tubes of essentially the same width. The tubes can form various desired angles to each other within the scope of the invention.

Two simple embodiments of the joint according to the invention are shown as examples in the accompanying drawings.

Figure 1:
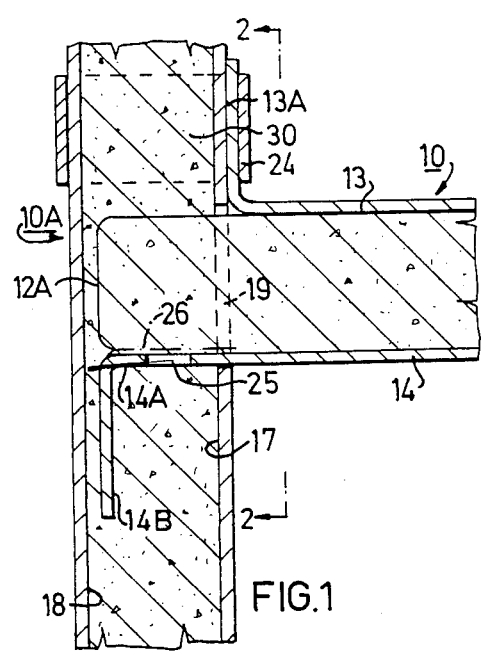
FIG. 1 shows a first embodiment of a joint according to the invention in section along the line 1—1 in FIG. 2.

FIG. 1 shows a horizontal first tube 10 of rectangular cross-section, comprising two side walls 11,12 and two transverse walls 13,14 between the edges of the side walls.

A second rectangular tube 10A has two side walls 15,16, a front wall 17 and a rear wall 18. The front wall is provided with a rectangular insertion opening 19 with lateral edges 20,21 and transverse edges 22,23.

In the example shown, the joint is made so that the first tube 10 fits relatively snugly into the opening 19. Any play can be taken up by seals (not shown).

In the inserted position shown in FIG. 1, the first tube 10 has two anchoring wings 11A,12A which are extensions of the side walls 11,12 and extend up to the vicinity of the rear wall 18.

The transverse walls 13,14 of the pipe extend up to the opening 19, and there the transverse wall 13 continues at the opening with a tongue 13A which lies against the front wall 17 of the tube 10A and is fixed in this position by means of a ring 24 around the tube 10A and over the tongue 24 to hold the tubes 10,10A in position when concrete is cast into the two tubes.

The second transverse wall 14 continues with an intermediate wall 14A which is bent in the vicinity of the rear wall 18 and extends with an anchoring tongue 14B along the rear wall 18.

In the intermediate wall 14A there is a flow-through opening 25, through which concrete can flow when the two pipes are filled with concrete, thus embedding the anchoring means 11A,12A,14A,14B in cast concrete.

Figure 3:
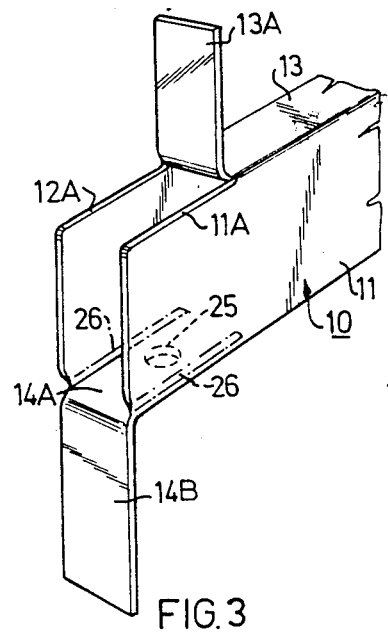
FIG. 3 is a perspective view of one end of the first tube with the anchoring means.

As is indicated in FIGS. 1 and 3, the intermediate wall 14A can be separated from the wings 11A,12A by means of slits 26, these being necessary if the wings 11A,12A are to be closer to each other than the width between the walls 11,12. The tongues 13A,14B and the intermediate wall 14A should have a corresponding smaller width, which is the case if the tube 10 has the same width as the tube 10A. The two tubes 10,10A can be identical. The opening 19 then takes up the entire internal width between the side walls 15,16 of the tube 10A.

Figure 4:
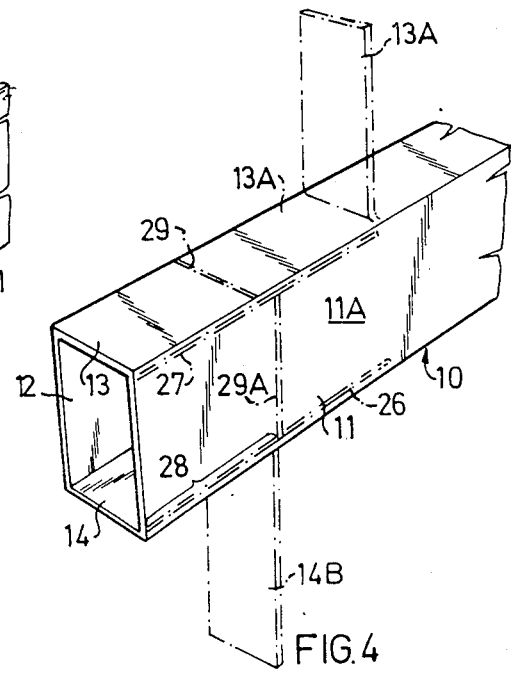
FIG. 4 shows the cutting and bending of the parts of the tube end to form anchoring means.

FIG. 4 shows how it is possible in a simple manner to achieve the tube end shown in FIG. 3 using a tube 10 of rectangular cross-section. Slits 27,28 are made in the side walls, e.g. using a laser. The slit 28 can be extended to form the slit 26. The transverse wall 13 is then cut at 29, and the tongue 13A is bent up. The side walls 11,12 are cut at 29A to leave the wings 11A,12A. The hole 25 has been made in the intermediate wall 14A. The tongue 14B is then bent downwards to the position for use.

In the example shown, the tube 10 forms a right angle with the tube 10A, but this angle can be selected as needed within the scope of the invention. The tongues 13A,14B will then have correspondingly changed angles relative to the tube 10. The wings 11A,12A can also have other shapes than those shown.

In FIG. 1, the two tubes are filled with expanding concrete 30, in a manner known per se.

Figure 2:
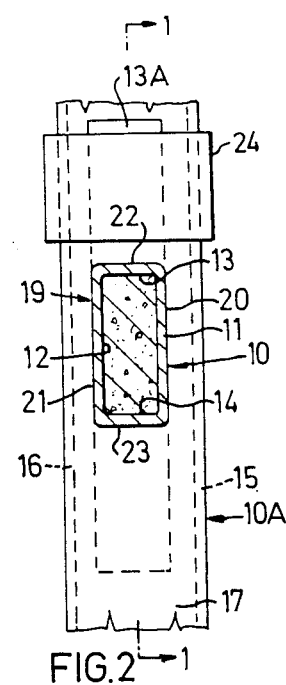
FIG. 2 is a section along the line 2—2 in FIG. 1.
Figure 5:
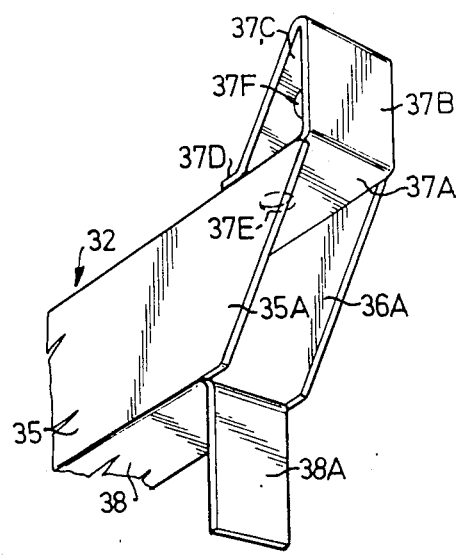
FIG. 5 shows the first tube of a second embodiment of the invention in a perspective view.
Figure 6:
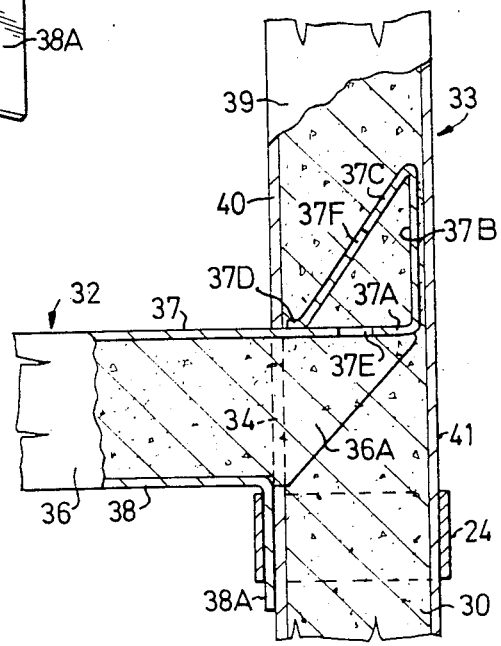
FIG. 6 shows in section this first tube mounted in the second tube.

The second embodiment of the joint of the invention is shown in FIGS. 5 and 6. A first tube 32 has its end connected to a second tube 33, both tubes being of rectangular cross-section as in the embodiment shown in FIGS. 1 and 2.

The tube 33 has an insertion opening 34 for receiving the anchoring end of tube 32 so that it can be secured by being embedded in the concrete injected.

The tube 32 has two side walls 35,36 and two transverse walls 37,38.

The tube 33 has two side walls 39, a front wall 40 and a rear wall 41.

At their ends the side walls 35,36 are extended with substantially triangular anchoring wings 35A,36A which have their narrow ends positioned adjacent to the rear wall 41.

The transverse walls 37,38 of the tube 32 extend to the opening 34, the transverse wall 38 being extended with a tongue 38A lying against the outer side of the front wall 40 and held in place by means of the ring 24.

The second transverse wall 37 is extended with an intermediate wall 37A positioned between the upper edges of the anchoring wings 35A,36A. At its end this wall is extended with a tongue 37B which is bent at an angle to the intermediate wall 37A and positioned along the wall 41.

At its end the tongue 37B is extended into a support wall 37C. This wall has an oblique position and extends to transverse wall 37 where it is provided with a foot 37D abutting the wall 40 above the upper edge of the opening 34.

In the intermediate wall 37A there is a flow-throw opening 37E, and in the support wall 37C there is an opening 37F, both openings being intended to facilitate distribution of the injected concrete to the spaces around the end of the tube 32 located in the tube 33.

The support wall 37C will reinforce the tongue 37B so that it will assist in maintaining the tube 37 in its predetermined position relative to the tube 33. The foot 37D or the lower end of the support wall 37C rests against the front wall 40 and cooperates with the ring 24 securing the tongue 34A to prevent the end of the tube 32 to leave its predetermined position in the tube 33 when injecting concrete in the two tubes under relatively high pressure.

What is claimed is:

1. Two tubes, said tubes being of square or rectangular cross-section, a first of said tubes having two spaced parallel side walls interconnected by two spaced parallel transverse walls, a second of said tubes having front and rear walls and an insertion opening through said front wall, both of said tubes being filled with concrete, said first tube having an end extending through said insertion opening into said second tube, said side walls of said first tube terminating inside said second tube in two anchoring wings, one of said transverse walls terminating in a tongue which lies along and is disposed outside of said front wall, the other transverse wall extending within said second tube toward and adjacent said rear wall of said second tube and terminating in an anchoring tongue with a extends along said rear wall, that portion of said other transverse wall, which is disposed within said second tube, having a flow-through hole for said concrete.

2. Structure according to claim 1, in which said two tubes are disposed at a right angle to each other.

3. Structure according to claim 1, in which said two anchoring wings are parallel to each other.

4. Structure according to claim 1, in which said other transverse wall within said second tube is integral with adjacent edges of said wings.

5. Structure according to claim 1, in which said transverse wall within said second tube is spaced from said wings.

6. Structure according to claim 1, in which the last-mentioned tongue terminates in a support wall that extends obliquely toward said insertion opening.

7. Structure according to claim 6, in which said support wall terminates in a foot that rests against an inner surface of said front wall.

* * * * *